US012494622B2

(12) United States Patent
Marrs

(10) Patent No.: US 12,494,622 B2
(45) Date of Patent: Dec. 9, 2025

(54) IGNITION SYSTEM USING PUSH-PULL TRANSFORMER

(71) Applicant: MARSHALL ELECTRIC CORP., Rochester, IN (US)

(72) Inventor: Thomas C. Marrs, Rochester, IN (US)

( * ) Notice: Subject to any disclaimer, the term of this patent is extended or adjusted under 35 U.S.C. 154(b) by 137 days.

(21) Appl. No.: 18/583,354

(22) Filed: Feb. 21, 2024

(65) Prior Publication Data

US 2025/0266665 A1 Aug. 21, 2025

(51) Int. Cl.

*H01T 13/44* (2006.01)
*H01T 13/04* (2006.01)
*H02M 7/538* (2007.01)

(52) U.S. Cl.

CPC ............. *H01T 13/44* (2013.01); *H01T 13/04* (2013.01); *H02M 7/538* (2013.01)

(58) Field of Classification Search

CPC .............. H01T 13/00–60; H02M 7/538; F02P 9/00–007; F02P 15/00–12

See application file for complete search history.

(56) References Cited

U.S. PATENT DOCUMENTS 3,563,221 A * 2/1971 Tada ........................ F02P 15/12 123/625
4,909,228 A * 3/1990 Wainwright .............. F02P 3/01 123/607
4,998,526 A 3/1991 Gokhae
5,806,504 A 9/1998 French
6,135,099 A 10/2000 Marrs
6,495,948 B1 * 12/2002 Garrett, III ............. H01T 13/32 313/142
10,385,819 B2 * 8/2019 Marrs ..................... F02P 3/005
10,788,006 B2 * 9/2020 Lorenz .................... F02P 9/007
2005/0016485 A1 * 1/2005 Miwa ...................... H01T 13/32 313/142

FOREIGN PATENT DOCUMENTS

EP 0233830 A2 * 8/1987 .............. F02P 15/10

* cited by examiner

*Primary Examiner* — Thienvu V Tran
*Assistant Examiner* — Christopher J Clark
(74) *Attorney, Agent, or Firm* — Egbert, McDaniel & Swartz, PLLC

(57) ABSTRACT

An ignition system for an internal combustion system has a power source for passing a DC voltage, a push-pull isolating transformer connected to the power source so as to increase the voltage from the power source and convert the DC voltage to AC voltage, a high-voltage transformer having a primary winding connected to an output of the push-pull isolating transformer, and a spark plug connected to a secondary winding of the high-voltage transformer. The high-voltage transformer increases the voltage from the push-pull isolating transformer to a voltage that fires the spark plug.

9 Claims, 5 Drawing Sheets

IGNITION SYSTEM USING PUSH-PULL TRANSFORMER

FIELD OF THE INVENTION

The present invention relates to internal combustion engines. More particularly, the present invention the relates to an electrical ignition apparatus that are used for the igniting of fuel within the internal combustion engines. The present invention also relates to ignition systems that apply an AC voltage for the ignition of the spark plug. Additionally, the present invention relates to ignition systems that utilize a push-pull transformer in combination with a pair of transistors so as to provide for AC power to the spark plug.

BACKGROUND OF THE INVENTION

Most internal combustion engines have some type of an ignition circuit to generate a spark in the cylinder. The spark causes combustion of the fuel in the cylinder to drive the piston and the attached crankshaft. Typically, the engine includes a plurality of permanent mount magnets mounted on the flywheel of the engine and a charge coil mounted on the engine housing in the vicinity of the flywheel. As the flywheel rotates, the magnets pass the charge coil. A voltage is thereby generated on the charge coil and this voltage is used to charge a high-voltage capacitor. The high-voltage charge on the capacitor is released to the ignition coil by way of a triggering circuit so as to cause a high-voltage, short-duration electrical spark across the spark gap of the spark plug and ignite the fuel in the cylinder. This type of ignition is called a capacitive discharge ignition.

Typically, the engine control module provides an electronic spark timing pulse which is used to command a given spark event for a given engine cylinder. This electronic spark timing pulse is commanded for a given amount of time to charge the primary coil to the desired current or energy. The electronic spark timing pulse duration is often referred to as “dwell-time” or charging time for a given coil and engine operating condition. As an example, during cold starting conditions, when the engine is cold, and the battery voltage is low, the electronic spark timing control signal for a given cylinder may have an extended pulse duration to fully charge the coil to generate the necessary energy in the primary coil. This energy is then transferred to the secondary coil that is connected to the spark plug output. Likewise, during hot engine conditions and nominal battery power, the electronic spark timing pulse can be commanded to have a shorter duration to fully charge the primary coil to a given energy level. Thus, a given electronic spark timing pulse for commanding a given coil operation will vary the dwell time, or charging time, depending on several engine sensor inputs and desired engine operating conditions.

Typically, current ignition systems use the electronic spark timing pulse to command a semiconductor power switch device which is connected to the primary coil and allows the coil to reach a targeted primary current. When the semiconductor power device is switched off, the stored energy in the primary coil is then transferred to the secondary coil. Based on the clamping voltage of the power semiconductor switch, and the turns ratio of the primary to secondary windings, an available voltage of approximately 40,000 volts can be provided to the spark plug output. Therefore, the high-voltage spark event is commanded by the falling edge of an electronic spark timing pulse. This translates to a command “turn-off” of the semiconductor power device and energy is then transferred to the spark plug with an exponential voltage decay. Typically, one spark event occurs for each electronic spark timing cycle for a given engine cylinder. This method of control has been employed by numerous engine control module designs used to command DC ignition systems for many years and has become the general method of firing a given spark plug used in an internal combustion engine.

The design of standard reciprocating internal combustion engines which use spark plugs and induction coils to initiate combustion have, for years, utilized combustion chamber shapes and spark plug placements which are heavily influenced by the need to reliably initiate combustion using a single short-duration spark of relatively low intensity that is timed to fire off of the falling edge of the given electronic spark timing pulse.

In recent years, however, increased emphasis has been placed on fuel efficiency, completeness of combustion, exhaust cleanliness, and reduced variability in cycle-to-cycle combustion. This emphasis has meant that the shape of the combustion chamber must be modified and the ratio of the fuel-air mixture changed. In some cases, a procedure has been used which deliberately introduces strong turbulence or a rotary flow to the fuel-air mixture at the area where the spark plug electrodes are placed. This often causes an interruption or blowing out of the arc. This places increasing demands on the effectiveness of the combustion initiation process.

Referring to FIG. 1, there is shown the ignition system in accordance with the prior art. This ignition system is illustrated, in particular, in association with U.S. Pat. No. 10,385,819 issued on Aug. 20, 2019 to Marshall Electric Corp., the present applicant. In FIG. 1, there is shown an ignition system 10 that has a transformer 12 that is directly connected to the spark plug 14. Similarly, a transformer 16 is directly connected to the spark plug 18. An electrical line 20 will extend from the engine control module 22 to the transformer 12. Another line 24 will extend from the engine control module 22 to the transformer 16. As such, the engine control module 22 (including the electronic spark timing circuit) can provide the necessary timing signals to the transformers 12 and 16 for the firing of the spark plugs 14 and 18, respectively. Each of the transformers 12 and 16 can be an ignition coil.

The transformer 12 can include a sensor line 26 extending back to the engine control module 22. As such, the engine control module 22 can receive suitable signals from the transformers 12 and 16 as to the operating conditions of the spark plugs 14 and 18 for proper monitoring of the output current and output voltage of the secondary winding. By providing this information, the engine control module 22 can be suitably programmed to optimize the firing of the spark plugs 14 and 18 in relation to items such as engine temperature and fuel consumption. The transformer 16 also includes a sensor line 28 extending back to the engine control module 22. An automotive battery 30 is connected by line 32 so as to provide power to the engine control module 22. The battery 30 is configured so as to supply at least eight volts to the engine control module 22.

As can be seen in FIG. 1, the firing of each of the spark plugs 12 and 16 is carried out directly on the spark plugs. The engine control module 22 can be a microprocessor which is programmed with the necessary information for the optimization of the firing of each of the spark plugs. The control module 22 can receive inputs from the crankshaft or from the engine as to the specific time at which the firing of the combustion chamber of each of the spark plugs 14 and 18 is necessary. Since each of the transformers 12 and 16 is located directly on the spark plugs 14 and 18, respectively, and since they operate at low frequencies, radio interference with the automobile is effectively avoided.

FIG. 2 shows a configuration of the spark plug 14. Spark plug 14 includes an anode 32 and a cathode 34 (the "electrodes"). This is a unique small-gap spark plug in which the distance between the electrodes is between 0.6 millimeters and 0.8 millimeters. This type of spark plug is manufactured by Pyrotek Enterprises, Inc. and is the subject of U.S. Pat. No. 6,495,948 of Dec. 17, 2002.

FIG. 3 is a plan view showing the configuration of the anode 32 in relation to the cathode 34 of the spark plug 14 as shown in FIG. 2. Initially, it can be seen that the anode 32 is located in the center of the spark plug 14. The cathode 34 is horseshoe-shaped and extends around at least a portion of the periphery of the anode 32. In U.S. Pat. No. 6,495,948, this type of spark plug 14 is referred to as a "box" plug. This box plug uses an electrode that is substantially in the shape of a square or a horseshoe that appears to encircle the spark plug's center electrode (when viewed from above). The box does not fully encircle the spark plug's center electrode since there is a gap defined between the upper round end surface of the center electrode and the plane in which the downwardly-directed lower surfaces of the split prong members lie.

The electrode includes a pair of end prongs which initially diverge but then converge. The end prongs include segments of substantially equal length. Two of the segments would be considered as diverging elements and the other segments would be considered as converging segments. An elbow is considered as connecting the diverging segment of a particular segment to the corresponding converging segment. The ground electrode would be considered to have three (vertixes), a main vertex 40 and a pair of elbow inner vertices 41.

FIG. 4 is an electrical schematic from the teachings of U.S. Pat. No. 10,385,819. In particular, unlike the present invention, the schematic shown in FIG. 4 includes both a booster circuit and a multi-strike circuit.

FIG. 4 is a schematic diagram showing the electronic control system 50, the power boost circuit 52, the multi-strike circuit 54 and the delay circuit 56 of the prior art system. Initially, the electronic spark timing pulse is received at terminal 51. The spark timing pulse is transmitted along line 52. A blocking diode combination 54 is provided so as to block current from returning back along line 52 to the electronic spark timing pulse. Line 52 will extend to a boost oscillator timing IC 56. The boost oscillator timing IC 56 will provide for the isolation of the signal and the timing of the signal. For example, if it is desired to set the logic high of the waveform for one-hundred milliseconds, then the boost oscillator timer IC can be set for such period of time. As such, this will create the necessary timing for the electronic spark timing pulse. The boost oscillator timer IC ultimately creates the waveform 42 which, in turn, will provide the necessary signal for the firing of the spark plugs in the manner shown by waveform 34. The boost oscillator timer IC is connected to the gate driver 58. Gate driver 58 is configured so as to alternately fire the field effect transistors 60 and 62. When the field effect transistors 60 and 62 are fired, the timing pulse can be transmitted to the spark plug or to the transformer 64. Ultimately, it is important that the gate driver 58 provide a fifty percent on/off duty cycle for each of the field effect transistors 60 and 62. As such, the field effect transistors 60 and 62 will never be on the same time. The field effect transistors 60 and 62 need to go on-and-off so as to avoid magnetic balancing issues on core saturation. This arrangement keeps the circuit sample, but effective. As will be described hereinafter, the power for the firing of the spark plugs is transmitted by the driver circuit by introducing the power to the field effect transistors 60 and 62.

In FIG. 4, a booster circuit 52 is provided so as to optimally store the power that is provided to the electronic spark timing circuit 60 so as to fire the respective spark plugs. The battery 30 is connected to the line 32 of the booster circuit 52. A diode 72 is provided on line 32 so as to prevent return current and voltage to the battery 30. The power from the battery 30 goes to a boost regulator so as to fix the voltage being transmitted to the inductor 78. Inductor 78 is a passive electronic component that stores energy in the form of a magnetic field. A diode 80 is provided on line 82 so as to block return current flowing to keep the charge on the capacitor 82. An input capacitor 84 is placed on line 86. Similarly, the output capacitor 84 serves to hold the charge as transmitted from the inductor 78. Ultimately, the output capacitor can be charged to twenty-eight volts. As a result, regardless of the firing of the respective spark plugs 14 and 18 by the electronic spark timing circuit 50 of the present invention, the capacitor 82 will continue to be charged during the process. As such, when the battery is low, the capacitor will continue to be charged. The lack of charge on the battery 30 will not change the waveform 34 in any way. All of the power for the firing of the spark plugs is a result of the charging of the capacitor 82. Fundamentally, if the engine speed is high, the battery 30 will be fully charged. This will meet the requirements for producing the waveform 34. If the battery is low and the car is idling, the charge in the battery will be low. However, the power required for the firing of the spark plugs as a virtue of the waveform 34 will be less. Since the capacitor 82 is continuously charged by the boost circuit 52 of the present invention, the present invention avoids the need for any charging time for the ignition coils or the transformers. The power is continuously available.

A field effect transistor 83 is cooperative between the capacitor 82 and the inductor 78. As such, this will effectively control the charging of capacitor 82 from the energy stored in the inductor 78.

The output 84 of the booster circuit 52 will be connected to the center tap of field effect transistors 60 and 62 in the electronic spark timing circuit 50. Output 86 is connected to ground. Field effect transistor 83 serves to control the charge inductor and the timer control. The field effect transistor 88 operates in combination with the gate driver IC 90 and with a boost oscillator IC 56. The boost oscillator IC 56 sets the frequency of the signal passing as the output 84. This would be typically 50,000 Hz. However, the boost oscillator 56 could be set so as to change the firing pattern during the waveform. It can be used so as to create a multi-strike waveform or a multi-burst waveform, as will be described hereinafter. A Zener diode 94 is located on feedback loop 96 so as to set the target voltage for the circuit 70.

The electronic spark timing signal 51 is also transmitted along line 52 to the multi-strike timer 100. Multi-strike timer 100 is a boost timer oscillator. This multi-strike oscillator 100 has a terminal connected to a terminal of the gate driver IC 58. As such, the multi-strike IC 100 can be controlled so as to set multiple strikes in a pulse from the electronic spark timing circuit. The multi-strike pulse can be fired continuously after the falling edge of the waveform. The multi-strike IC 100 can, in the preferred embodiment the present invention, set pulses of between 1 millisecond and 2 milliseconds. When multi-strikes are used during the firing of the spark plug, this can tend to create a more complete and cleaner combustion. Furthermore, it can also serve to reduce fuel requirements. The multi-strike oscillator 100 can create multiple strikes during the time period between the falling edge and the rising edge of the waveform. This period of time will be between ten milliseconds and fifty milliseconds. The oscillator in the multi-strike IC 100 transmits a signal to the gate driver 58 for action in conjunction with the field effect transistors 60 and 62.

The delay circuit 56 can be used in conjunction with the multi-strike circuit 54 and the electronic spark timing circuit 50. The delay circuit 56 has a timer delay IC 102 that is cooperative with the electronic spark timing signal 51. It can be seen that line 52 transmits the signal to the timer delay IC 102. Timer delay IC 102 is connected to a terminal of the multi-strike IC 100. In particular, the timer delay IC will be a NOR gate circuit. The NOR gate is a logic gate which gives a positive output only when both inputs are negative. NOR gates are so-called "universal gates" that can be combined to form any other types of logic gate. As such, this NOR gate circuit can be used in connection with the electronic spark timing pulse so as to control and fix a delay of the pulse. For example, the timer delay IC 102 can be set so as to begin the spark-driving pulse at a time after the falling edge of the waveform. Alternatively, it can be set so as to create a delay between firing pulses during the period between the falling edge and the rising edge of the waveform. Various other configurations of delay can be implemented through the use of the delay circuit 56. Additionally, the delay circuit can be combined with the multi-strike circuit 54 so as to create delay associated with the multi-strike firing of the spark plug.

The schematic of FIG. 4 has an extremely large number of components. So as to enhance the reliability of the ignition system, it was felt necessary to reduce the number of components in order to provide a durable, accurate and fuel efficient system.

The circuit shown in FIG. 4 of U.S. Pat. No. 10,385,819 is made up of two parts. This is the DC voltage boost circuit and the basic circuit which provides the main frequency and the basic circuit. The basic circuit provides the main frequency, the twelve volt battery, the power source, the arc duration, and the EST signal which tells the circuit when the spark. It was found that the boost circuit does not deliver the required output voltage. The DC boost voltage is required to boost the twelve volts of the battery to approximately forty volts DC. The circuit involves a large capacitor (of 680 microfarads) that turns the twelve volts on-and-off through inductor at a high-frequency supply and then is turned off-and-on with a MOSFET.

The required forty volts AC then goes through a push-pull circuit that feeds the primary of the high-frequency transformer. The problems with the boost circuit in this patent are that the capacitor in the circuit must be much larger in order to store energy necessary to deliver the necessary spark voltage and current to the spark gap of the spark plug. The capacitor does not stand up well at the under-hood temperatures. As such, failures could occur. Additionally, the boost circuit cannot be run at a high enough frequency to deliver adequate energy to the capacitor.

In the past, various patents have issued with respect to such ignition systems. For example, U.S. Pat. No. 5,806,504, issued on Sep. 15, 1998 to French et al., teaches an ignition circuit for an internal combustion engine in which the ignition circuit includes a transformer having a secondary winding for generating a spark and having first and second primary windings. A capacitor is connected to the first primary winding to provide a high-energy capacitive discharge voltage to the transformer. A voltage regulator is connected to the secondary primary winding for generating an alternating current voltage. A control circuit is connected to the capacitor and to the voltage generator for providing control signals to discharge the high-energy capacitive discharge voltage to the first primary winding and for providing control signals to the voltage generator so as to generate an alternating current voltage.

U.S. Pat. No. 4,998,526, issued on Mar. 12, 1991 to K. P. Gokhae, teaches an alternating current ignition system. The system applies alternating current to the electrodes of a spark plug to maintain an arc at the electrodes for a desired period of time. The amplitude of the arc current can be varied. The alternating current is developed by a DC-to-AC inverter that includes a transformer that has a center-primary and a secondary that is connected to the spark plug. An arc is initiated at the spark plug by discharging a capacitor to one of the winding portions at the center-primary. Alternatively, the energy stored in an inductor may be supplied to a primary winding portion to initiate an arc. The ignition system is powered by a controlled current source that receives input power from a source of direct voltage, such as a battery on the motor vehicle.

In each of these prior art patents, the devices used dual mechanisms in which a high-energy discharges were supplemented with a low-energy extending mechanism. The method of extending the arc, however, presents problems to the end-user. First, the mechanism is, by nature, electronically complex in that multiple control mechanisms must be present either in the form of two separate arc mechanisms. Secondly, no method is presented for automatically sustaining the arc under a condition of repeated interruptions. Additionally, these mechanisms do not necessarily provide for a single functional-block unit of low mass and small size which contains all of the necessary functions within.

U.S. Pat. No. 6,135,099, issued on Oct. 24, 2000 to T. Marrs, discloses an ignition system for an internal combustion engine that comprises a transformer means having a primary winding adapted to be connected to a power supply and having a secondary winding adapted be connected to a spark plug. The transformer serves to produce an output from the secondary winding having a frequency of between 1 kHz and 100 kHz and a voltage of at least 20 kV. A controller is connected to the transformer so as to activate and deactivate the output of the transformer means relative to the combustion cycle. The transformer serves to produce the output having an alternating current with a high-voltage sine wave reaching at least 20 kV. A voltage regulator is connected to the power supply into the transformer so as to provide a constant DC voltage input to the transformer. The transformer produces power of constant wattage from the output of the secondary winding during the activation by the controller. The controller is connected to the transformer so as to allow the transformer to produce an arc of controllable duration across the electrode of the spark plug. This duration can be between 0.5 milliseconds and 4 milliseconds. A battery is connected the primary winding of the transformer. The battery produces a variable voltage of between 5 and 15 volts.

For example, U.S. Pat. No. 5,806,504, issued on Sep. 15, 1998 to French et al., teaches an ignition circuit for an internal combustion engine in which the ignition circuit includes a transformer having a secondary winding for generating a spark and having first and second primary windings. A capacitor is connected to the first primary winding to provide a high-energy capacitive discharge voltage to the transformer. A voltage regulator is connected to the secondary primary winding for generating an alternating current voltage. A control circuit is connected to the capacitor and to the voltage generator for providing control signals to discharge the high-energy capacitive discharge voltage to the first primary winding and for providing control signals to the voltage generator so as to generate an alternating current voltage.

U.S. Pat. No. 4,998,526, issued on Mar. 12, 1991 to K. P. Gokhae, teaches an alternating current ignition system. The system applies alternating current to the electrodes of a spark plug to maintain an arc at the electrodes for a desired period of time. The amplitude of the arc current can be varied. The alternating current is developed by a DC-to-AC inverter that includes a transformer that has a center-primary and a secondary that is connected to the spark plug. An arc is initiated at the spark plug by discharging a capacitor to one of the winding portions at the center-primary. Alternatively, the energy stored in an inductor may be supplied to a primary winding portion to initiate an arc. The ignition system is powered by a controlled current source that receives input power from a source of direct voltage, such as a battery on the motor vehicle.

U.S. Pat. No. 6,135,099, issued on Oct. 24, 2000 to T. Marrs, discloses an ignition system for an internal combustion engine that comprises a transformer means having a primary winding adapted to be connected to a power supply and having a secondary winding adapted be connected to a spark plug. The transformer serves to produce an output from the secondary winding having a frequency of between 1 kHz and 100 kHz and a voltage of at least 20 kV. A controller is connected to the transformer so as to activate and deactivate the output of the transformer means relative to the combustion cycle. The transformer serves to produce the output having an alternating current with a high-voltage sine wave reaching at least 20 kV. A voltage regulator is connected to the power supply into the transformer so as to provide a constant DC voltage input to the transformer. The transformer produces power of constant wattage from the output of the secondary winding during the activation by the controller. The controller is connected to the transformer so as to allow the transformer to produce an arc of controllable duration across the electrode of the spark plug. This duration can be between 0.5 milliseconds and 4 milliseconds. A battery is connected the primary winding of the transformer. The battery produces a variable voltage of between 5 and 15 volts.

It is an object of the present invention to provide an ignition system that has improved fuel efficiency.

It is another object of the present invention to provide an ignition system that has a longer arc duration.

It is another object of the present invention to provide an ignition system that fires at a lower voltage.

It is another object of the present invention to provide an ignition system that has a cool operation.

It is another object of the present invention to provide an ignition coil that produces reduced emissions.

It is another object of the present invention to provide an ignition system that increases the horsepower of the engine.

It is another object of the present invention to provide an ignition system that offers a more complete burning of the fuel.

It is another object of the present invention to provide an ignition system that produces no misfires.

It is a further object of the present invention provided in the ignition system that does not require a DC voltage boost.

It is still another object of the present invention to provide it ignition system that has increased durability.

It is still a further object of the present invention provided ignition system that is simplified electronics.

These and other objects and advantages of the present invention will become apparent from a reading of the attached specification and appended claims.

BRIEF SUMMARY OF THE INVENTION

The present invention is an ignition system for an internal combustion engine that comprises a power source for passing a DC voltage, a push-pull isolating transformer connected to the power source, a high-voltage transformer having a primary winding connected to an output of the push-pull isolating transformer, and a spark plug connected to a secondary winding of the high-voltage transformer. The push-pull isolating transformer increases the voltage from the power source and converts the DC voltage to AC voltage. The high-voltage transformer increases the voltage from the push-pull isolating transformer.

In the present invention, the power source will be an automotive battery. In the preferred embodiment of the present invention, the power source is an automotive battery. The DC voltage of this power source is twelve volts DC.

The push-pull isolating transformer has a primary winding and a secondary winding. The primary winding of the push-pull isolating transformer is connected to a pair of transistors. The pair of transistors pass energy to the primary winding of the push-pull isolating transformer during alternating half-cycles. The primary winding of the push-pull isolating transformer is center tapped. Each of the transistors has a diode interposed between the transistor and the primary winding. The push-pull isolating transformer increases twelve volts DC from the power source to forty volts AC at ninety kilohertz. The secondary winding of the push-pull isolating transformer is connected to the high-voltage transformer.

The high-voltage transformer increases of voltage from the push-pull isolating transformer to thirty-five kilovolts so as to pass the thirty-five kilovolts to the spark plug.

The spark plug has a secondary spark plug gap between a electrodes thereof of between 0.6 millimeters and 0.8 millimeters. One of the electrodes of the spark plug is in a center thereof. The other electrodes is horseshoe-shaped and at least partially extends around an outer diameter of the anode.

In comparison with the prior art, the DC voltage boost circuit is replaced by small push-pull isolating transformer that increases the twelve volts DC to forty volts AC at ninety kilohertz. The output of the push-pull transformer is connected to the primary winding of the high-voltage transformer. The primary of the high-voltage transformer is six turns without any center tap. This improves the durability and simplifies the component construction. The present invention also reduces the small components required in the DC voltage boost circuit.

The large gap spark plug is replaced by a small gap (0.6 millimeters to 0.8 millimeters) spark plug. This reduces the voltage required at the spark plug. As a result, heat and energy required are reduced. The present system can be set with a ninety kilohertz frequency to reduce the capacitive load on the high-voltage secondary.

The dwell table from the engine can be used to adjust the arc duration of the spark plug according to the RPM of the engine. As the RPM increases, the arc duration needs to decrease.

With reference to U.S. Pat. No. 10,385,819, the present invention replaces the boost circuit with a small transformer and also turns the twelve volts DC into AC current before it enters the small transformer. The small transformer is then steps up the twelve volts AC to forty volts AC. This can then be delivered to the high-voltage transformer.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 5:
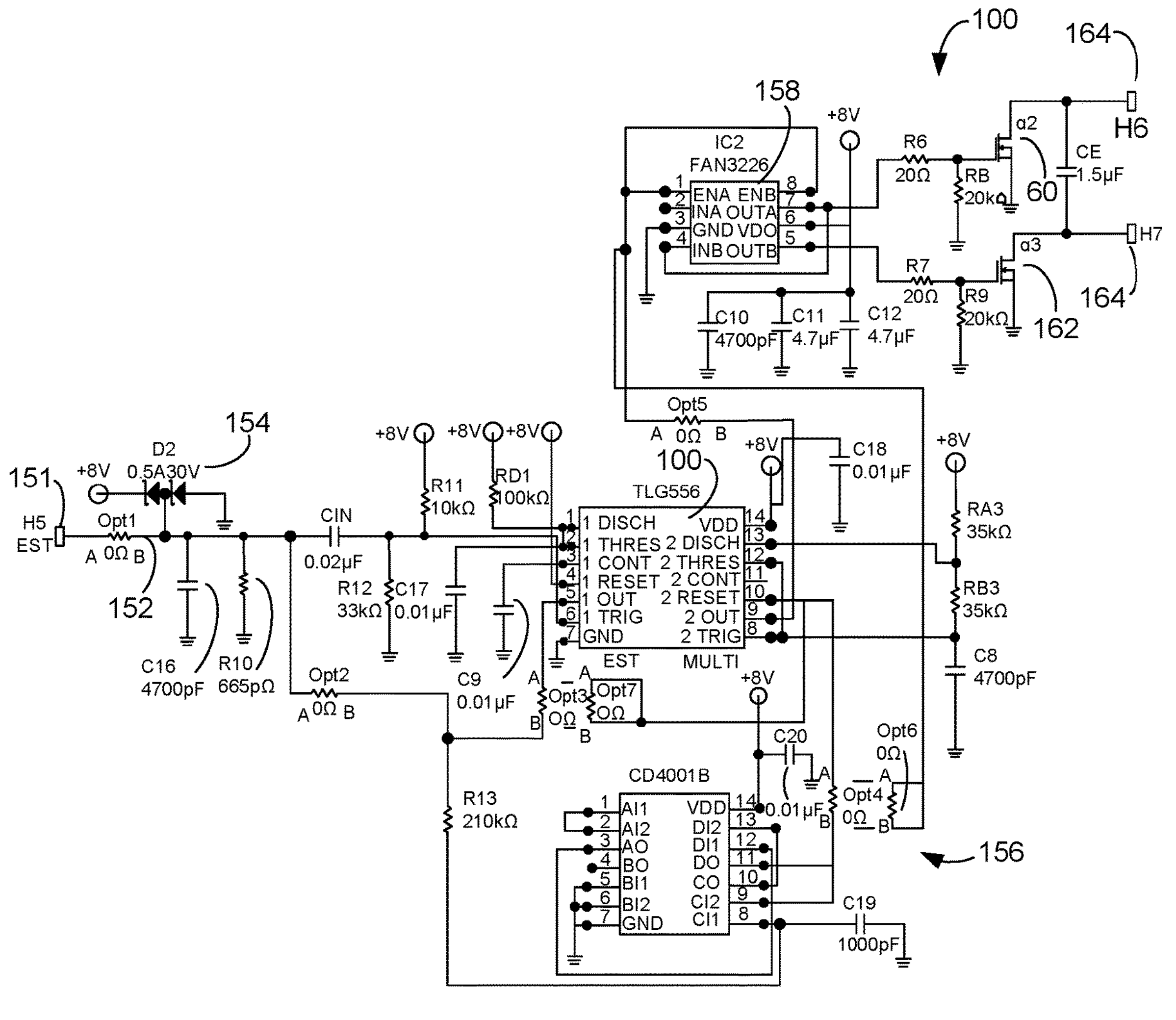
FIG. 5 is a schematic showing a schematic of ignition system used in the present invention.

Referring to FIG. 5, there is a schematic of the ignition system 100 of the present invention. Initially, the electronic spark timing pulse is received at terminal 151. The spark timing pulse is transmitted along line 152. A blocking diode combination 154 is provided so as to block current from returning back along line 152 to the electronic spark timing pulse. Line 152 will extend to an oscillator timing IC 156. This oscillating timing IC 156 will provide for the isolation of the signal in the timing of the signal. For example, if it is desired to set the logic high of the waveform for one-hundred milliseconds, the oscillator timer IC 156 can be set for such a period of time. As such, this will create the necessary timing for the electronic spark timing pulse. The oscillator timing IC 156 ultimately creates the waveform to provide the necessary signal for the firing of the spark plugs. The oscillator timer IC 156 is connected to a gate driver 158.

Gate driver 158 is configured so as to alternately fire the transistors 160 and 162. When the transistors 160 and 162 are fired, the timing pulse can be transmitted to the spark plug or to the transformer 164. In particular, the timing pulse is transmitted to the primary winding of the transformer 164. Ultimately, it is important that the gate driver 158 provide a 50% on/off duty cycle for each of the transistors 160 and 162. As such, the transistors 160 and 162 will never be "on" at the same time. The transistors 160 and 162 need to go on-and-off so as to avoid magnetic balancing issues on core saturation. This arrangement keeps the circuit simple, but effective. The power for the firing of the spark plugs is transmitted by the driver circuit for introducing the power to the transistors 160 and 162.

Figure 6:
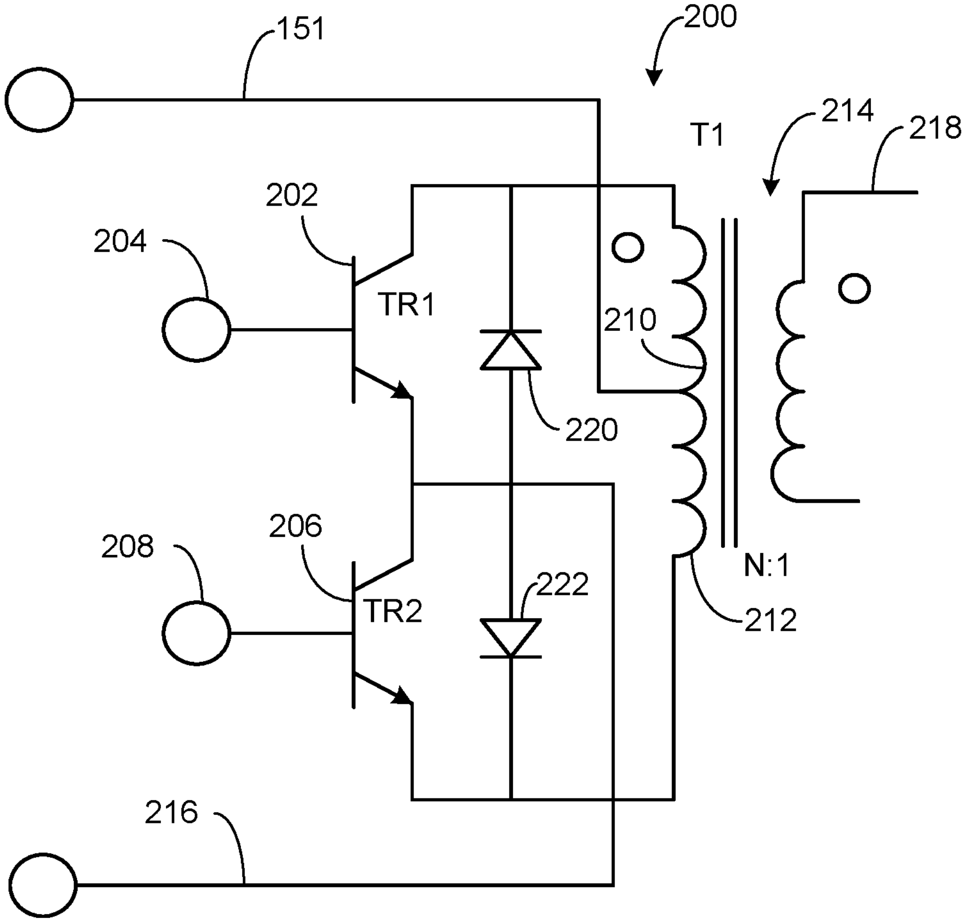
FIG. 6 is a isolated schematic showing the push-pull isolating transformer as used in conjunction with the high-voltage transformer of the present invention.

The gate driver 158 and the transistors 160 and 162 will be part of the push-pull isolating transformer as shown at 200 in FIG. 6. As can be seen, the first transistor 202 will be connected to a terminal 204 of the gate driver 158. Similarly, the transistor 206 will be connected to another terminal 208 of the gate driver 158. As such, the gate driver 158 (as shown in FIG. 5) is able to provide an alternating duty cycle for each of the transformers 202 and 206. Power supply 151 will extend to a center tap 210 of a primary winding 212 of transformer 214. Line 216 extends to each of the transistors 202 and 206 so as to supply thereto. Ultimately, the transistors 202 and 206 operate in an one-half-cycle on-and-on mode so as to pass twelve volts DC from the power supply 151 as forty volts to the transformer 214. The secondary 218 of the transformer 214 can be connected to a high-voltage transformer (such as shown and known in the prior art) so as to boost the forty volts AC at ninety kilohertz so as to fire the spark plugs at thirty-five kilovolts.

A diode 220 will act on the input and output of the transistor 202 so as to avoid voltage spikes to the transformer 214. Similarly, another diode 222 is cooperative with the second transformer 206 so as to avoid voltage spikes to the transformer 218.

The push-pull isolating transformer circuit 200, shown in FIG. 6, utilizes the center-tapped transformer 214 to use both top and bottom half-cycles from the transistors 202 and 206. The schematic shown in FIG. 6 shows the push-pull converter in which the push-pull converter utilizes the center-tapped primary 212 of the transformer 214 for the primary winding. The primary winding 212 is controlled by the transistors 202 and 206. The transistors allow them to conduct during each half-cycle so that the output is receiving voltage directly through one of the transistors at all times. This means that the efficiency of the configuration is approximately 90%. This allows the overall size for the power supply to be smaller for comparables power supply whose efficiency is 75% to 80%.

Figure 4:
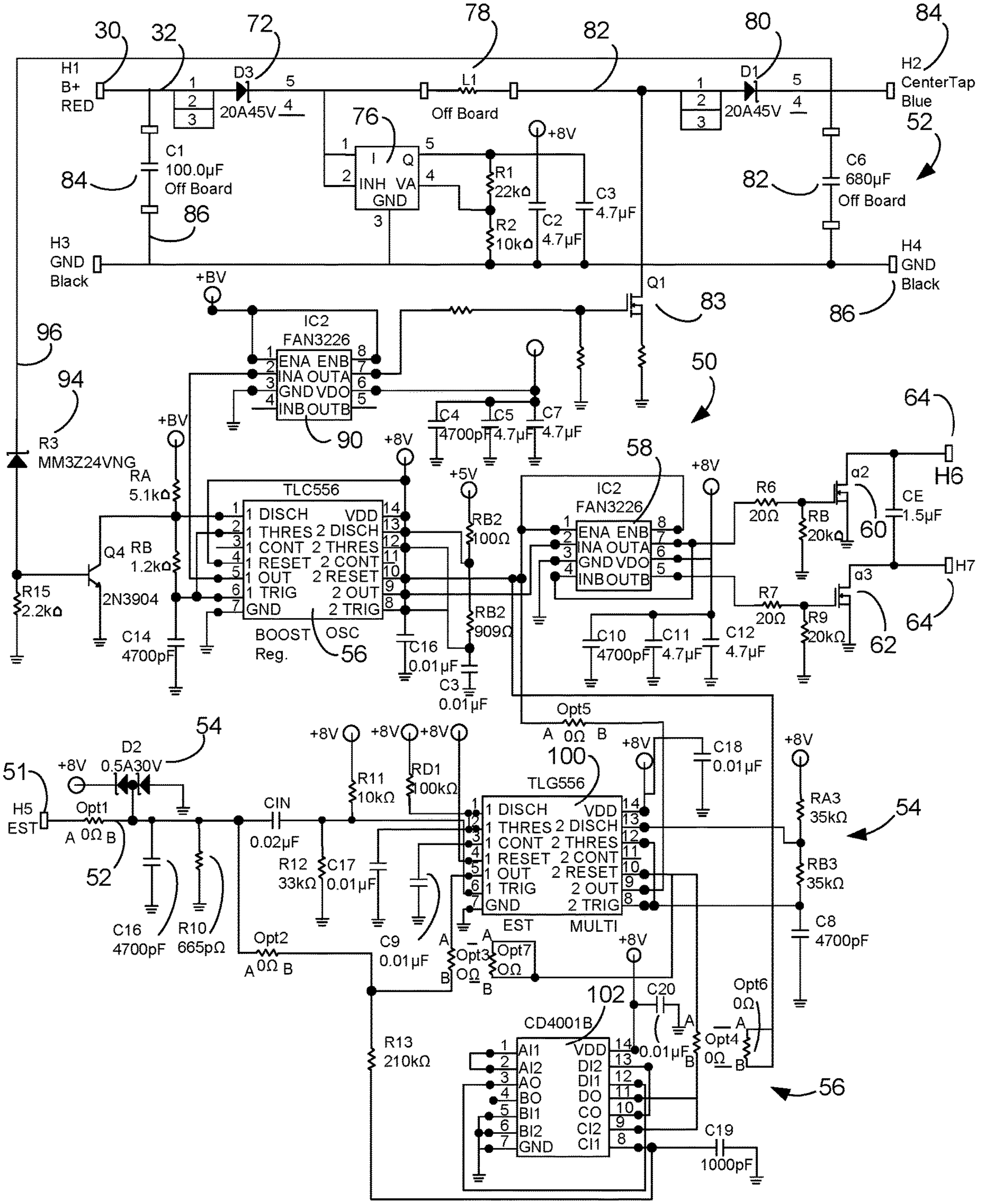
FIG. 4 PRIOR ART
FIG. 4 is an electrical schematic of a prior art ignition system of the present Applicant.

As shown in FIGS. 5 and 6, the DC voltage boost circuit (as shown in FIG. 4) has replaced by the small push-pull isolating transformer 200 (as shown in FIG. 6). This increases the twelve volts DC to forty volts AC at ninety kilohertz. The output of the push-pull transformer is connected to the primary winding of a high-voltage transformer. The primary of the high-voltage transformer will be six turns without any center tap.

The configuration of the present invention improves the durability and replaces the component count. The MOSFETS of the prior art shown in FIG. 4, are replaced by the push-pull isolating transformer. It also replaces all the other small components required in the DC voltage boost circuit of FIG. 4.

Figure 1:
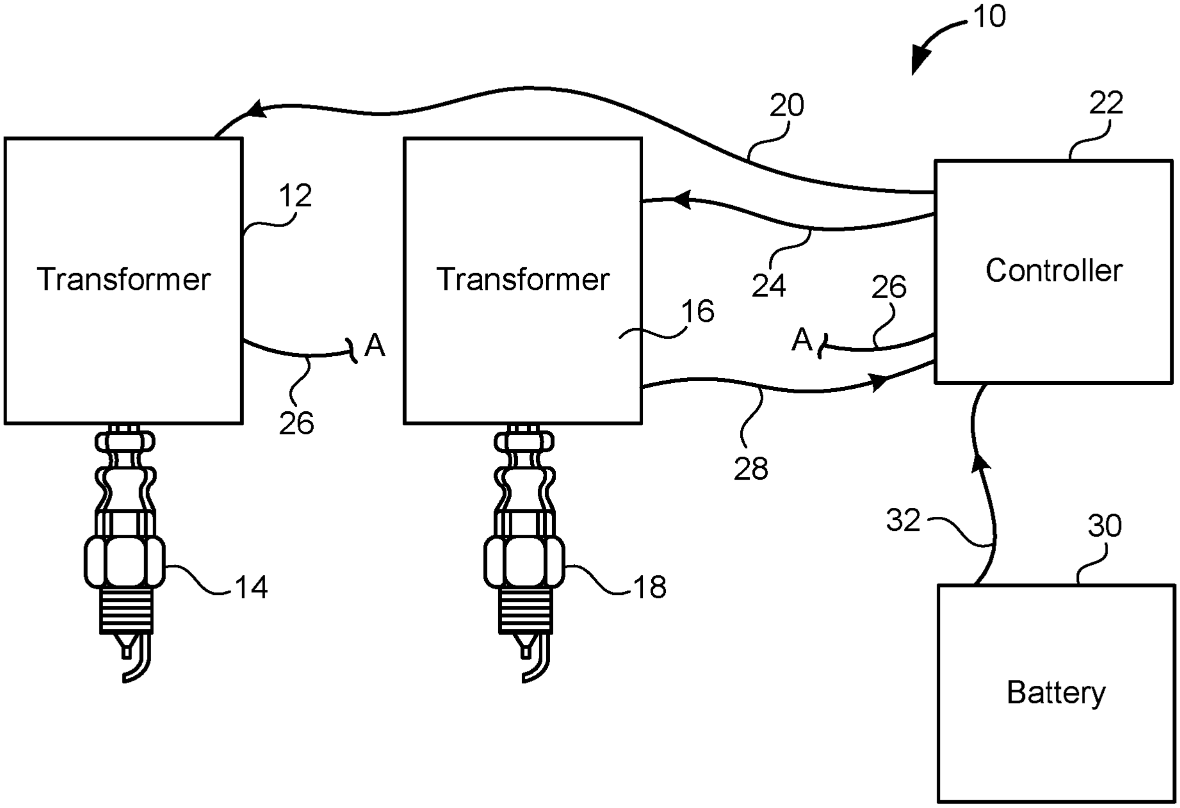
FIG. 1 PRIOR ART
FIG. 1 is a block diagram showing an ignition system including the controller and the spark plugs to which the ignition system of the present invention is applied.
Figure 2:
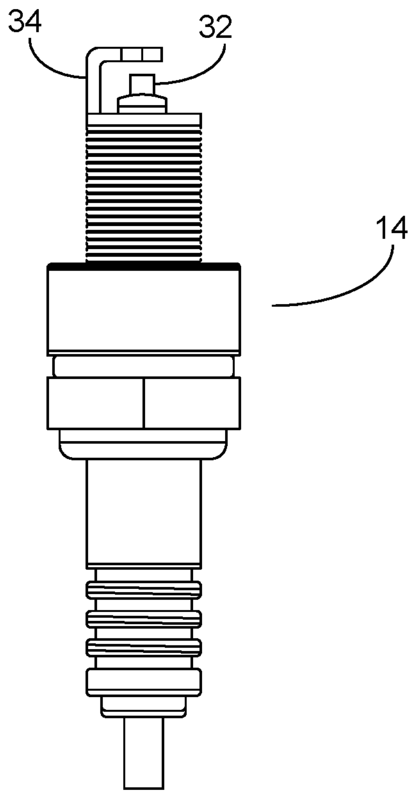
FIG. 2 PRIOR ART
FIG. 2 is a plan view of a small-gap spark plug is used in the present invention.
Figure 3:
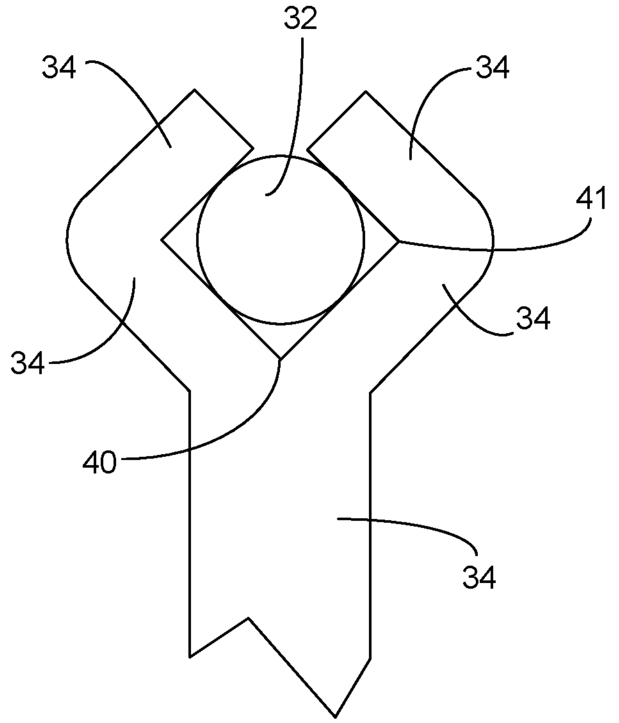
FIG. 3 PRIOR ART
FIG. 3 is a plan view showing the electrodes of the small-gap spark plug of FIG. 2 of the prior art.

The standard large-gap spark plug is replaced by a small gap spark plug. This gap is between 0.6 millimeters to 0.8 millimeters. This small gap reduces the voltage required at the spark plug. It also reduces the heat and energy required. It is important to use such a small gap spark plug (as was shown in FIGS. 2 and 3 herein), so as to work properly with the present invention, to achieve the advantages of the present invention, and to cooperate properly with the push-pull isolating transformer.

The output of the transformers is set to ninety kilohertz in order to reduce the capacity of load on the high-voltage secondary. A dwell table from the engine can be used to adjust the arc duration of the spark according to the RPM of the engine. As the RPM increases, the arc duration needs to decrease.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. An ignition system for an internal combustion engine, the ignition system comprising:

a power source for passing a DC voltage;

a push-pull isolating transformer connected to the power source, said push-pull isolating transformer increasing the voltage from said power source and converting the DC voltage to AC voltage, said push-pull isolating transformer having a primary winding and a secondary winding, the primary winding of said push-pull isolating transformer being connected to a pair of transistors, each of the pair of transistors having a diode connected between the transistor and the primary winding;

a high-voltage transformer having a primary winding connected to an output of said push-pull isolating transformer, said high-voltage transformer for increasing the increased voltage from said push-pull isolating transformer; and a spark plug connected to a secondary winding of said high-voltage transformer.

2. The ignition system of claim 1, said power source being an automotive battery.

3. The ignition system of claim 2, the DC voltage of said power source being twelve volts DC.

4. The ignition system of claim 1, wherein the pair of transistors passes energy to the primary winding of said push-pull isolating transformer during alternating half-cycles respectively.

5. The ignition system of claim 1, the primary winding of said push-pull isolating transformer being center tapped.

6. An ignition system for an internal combustion engine, the ignition system comprising:

a power source for passing a DC voltage;

a push-pull isolating transformer connected to the power source, said push-pull isolating transformer increasing the voltage from said power source and converting the DC voltage to AC voltage, said push-pull isolating transformer having a primary winding and a secondary winding, the primary winding of said push-pull isolating transformer being connected to a pair of transistors;

a high-voltage transformer having a primary winding connected to an output of said push-pull isolating transformer, said high-voltage transformer for increasing the increased voltage from said push-pull isolating transformer; and a spark plug connected to a secondary winding of said high-voltage transformer, said push-pull isolating transformer increasing a twelve volts DC from said power source to forty volts AC at ninety kilohertz, the secondary winding being connected to said high-voltage transformer.

7. The ignition system of claim 1, the high-voltage transformer increasing the voltage from said push-pull isolating transformer to thirty-five kilovolts so as to pass the thirty-five kilovolts to said spark plug.

8. The ignition system of claim 1, said spark plug having a spark plug gap between cathode electrodes thereof of between 0.6 millimeters and 0.8 millimeters.

9. The ignition system of claim 8, one of the electrodes of said spark plug being in a center thereof, another electrode of the electrodes of said spark plug having a horseshoe shape and at least partially extending around an outer diameter of the one of the electrodes.

* * * * *